Jan. 19, 1965
H. MERSON
3,166,003
DRIP TYPE COFFEE MAKER
Filed June 22, 1961
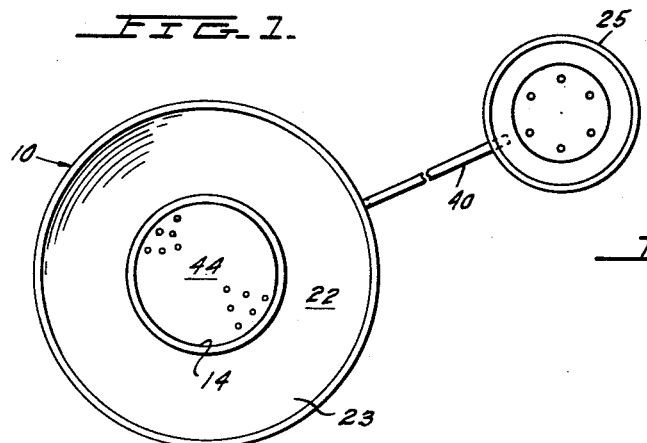
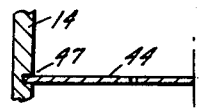
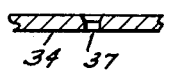
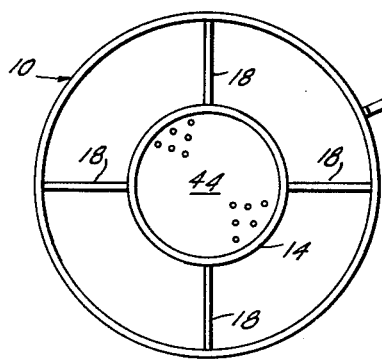
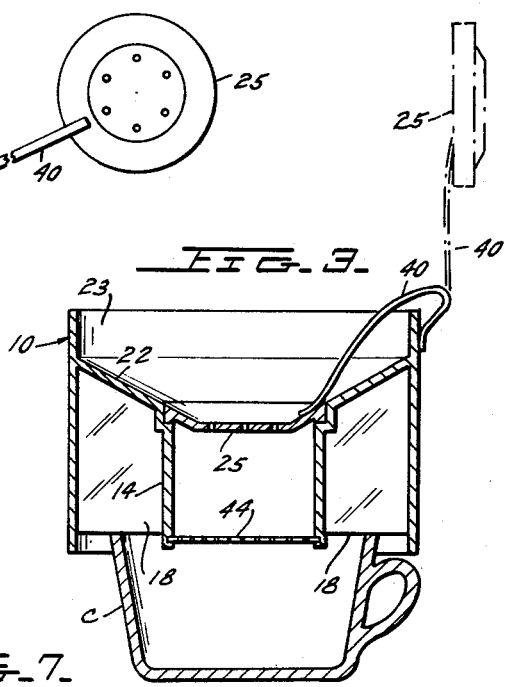
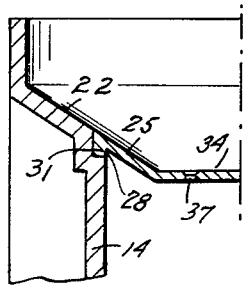
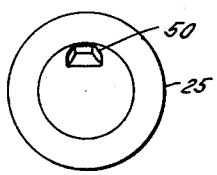
INVENTOR.
HAROLD MERSON
BY
OSTROLENK, FABER, GERB & SOFFEN
ATTORNEYS

United States Patent Office 3,166,003
Patented Jan. 19, 1965

3,166,003
DRIP TYPE COFFEE MAKER
Harold Merson, East Meadows, N.Y., assignor to RMS Electronics, Inc., New York, N.Y., a corporation of New York
Filed June 22, 1961, Ser. No. 118,957
2 Claims. (Cl. 99—306)

This invention relates to coffee makers of the so-called drip type and more particularly to a coffee maker for making a single cup of coffee at a time by dripping brewed coffee directly into a cup.

It is an object of the invention to provide a simple and economical coffee-making device which can be readily manufactured in mass production by plastic molding.

It is another object of the invention to provide a drip type coffee maker which will be of rugged integral construction, last definitely, and be readily washable so as to be sanitary at all times and one which can be rinsed and left to drain with no surface that would be touched by water or coffee, in subsequent use, in contact with a drainboard, sink, etc.

Briefly, the invention comprises a generally cylindrical structure of integrally molded plastic having concentric cylindrical shells with opposed walls having radial reinforcing ribs therebetween. The ribs also constitute support surfaces for maintaining the utensil supported on the rim of a cup to receive coffee drip from the bottom of the structure. The inner shell or cylinder is joined by a sloping surface to the outer shell or cylinder so that hot water poured into the outer cylinder can feed by gravity into the inner cylinder. The upper end of the inner cylinder is provided with a removable nozzle plate having a predetermined number of perforations so that hot water is metered into the inner cylinder at a rate determined by the number of perforations and the diameters thereof. Such perforations are in effect small nozzles for directing a plurality of thin streams of water downwardly into the inner cylinder. The inner cylinder forms a coffee basket or holder for drip ground coffee and terminates at its bottom in a fine mesh or minutely perforated metal plate to effect a strainer and filter.

A particular feature of the invention resides in the removable nozzle plate which covers the top of the coffee basket, such plate having a snug, flexible snap fit in a suitably provided rabbet and is fastened by means of a bendable, flexible strap to the utensil. Thus, by pulling on the strap, such nozzle plate may be readily removed, from its seat, either for filling the coffee holder or for cleansing purposes.

Such bendable strap, preferably of plastic, serves as a handle and prevents loss; and serves as a support when the plate is in pulled out position so that it is kept out of contact with foreign objects after rinsing.

A detailed description of the invention now follows in conjunction with the appended drawing, in which:

FIGURE 1 is a plan view from the top;
FIGURE 2 is a plan view from the bottom;
FIGURE 3 is an elevation in cross-section showing the utensil mounted on a cup;
FIGURE 4 is a magnified portion of FIGURE 3;
FIGURE 5 is another magnified portion of FIGURE 3; and
FIGURE 6 is an additional magnified portion of FIGURE 3.
FIGURE 7 is a view in perspective of a modified and preferred form of cover plate 25.

Referring to the drawing, the utensil comprises a molded plastic construction which may be either of one integrally molded piece or two integrally secured pieces comprising an outer cylindrical shell 10 and a concentric inner shell or coffee basket 14. Intermediate the shells are four integral ribs 18 spaced 90° apart. Thus, as is apparent from FIGURE 3, the structure can be supported on the rim of a cup C, the lower edges of the ribs engaging the cup rim.

At the top of shell 14 and intermediate the shells is a sloped floor or wall 22, which effects a water receiving basket 23. The upper end of the inner shell 14 accommodates a removable nozzle or cover plate 25 having a skirt 28 which fits snugly in a rabbet 31 provided at the upper end of shell 14 as best shown in FIGURE 4. Thus, it will be apparent that by providing suitable flexibility for plate 25, a sealing snap tight fit for such cover in the rabbet can be provided. The cover plate 25 will be noted as having a sloping peripheral margin which forms part of the sloping wall 22 leading to a generally horizontal central area 34 which is provided with a ring of nozzles 37, as best shown in FIGURE 6. In this instance, some six such nozzles are shown, effected by aperturing of the cover plate.

From the above description, it will be apparent that hot water poured into the pocket 23 of the utensil will be metered through the nozzles 37 into the coffee basket, i.e., the shell 14.

In order to effect a handle for and also to prevent loss of cover plate 25, a bendable flexible plastic strip 40 is provided which may be cemented at one end, as shown in FIGURE 3, to cover plate 25, and at its outer end to the exterior wall of cylinder 10. Alternatively, strap 40 may be molded integrally with plate 25, it being understood that the plate is molded of sufficiently flexible material to permit the strap to flex for substantially complete removal of the plate, as shown in phantom in FIGURE 3 or for insertion of the plate.

In a preferred form, shown in FIGURE 7, the cover plate 25 may be a separate member having a handle 50.

It will, of course, be appreciated that other forms of tie members may be used; for example, a ball chain or the like. However, by utilizing a material such as polyethylene, strap 40 can be bendable yet have sufficient rigidity to support plate 25 in the position shown in phantom lines in FIGURE 3. Thus, for permitting the plate to drain dry after rinsing out of contact with any foreign support surface such as a drainboard, sink, or the like, the strap 40 has increased utility.

The lower end of coffee basket 14 is closed by means of a finely perforated disc 44 which may be snapped into place at its periphery in a groove 47 (FIGURE 5) or may be secured at the end of the coffee basket in various ways, for example, by being molded in place, in situ.

From the above description, the operation of the utensil will be obvious. Thus, considering FIGURE 1 with the coffee basket 14 open at the top, a charge of drip ground coffee is placed therein, the cover 25 is then snapped into place, the structure being placed on the rim of a cup, as shown in FIGURE 3. A charge of hot water specifically one cupful, is then poured into pocket 23 which water gravitates through the metering nozzles 37 and steeps in the coffee charge in shell 14 to brew coffee, ultimately dripping through the finely perforated plate 44 into the cup.

It will be apparent from the above description that I have provided a simple and readily produced drip type coffee maker which can be molded in a single piece, the cover plate 25 being, of course, a separate member. Alternatively, depending upon the type of molds used, the body structure can be molded of two pieces split axially or radially at any appropriately chosen plane for subsequent cementing together.

Having thus described my invention, I am aware that various changes may be made without departing from the spirit thereof and, therefore, do not seek to be limited to the precise illustrations herein given, except as set forth in the appended claims.

I claim:

1. A drip grind coffee maker comprising inner and outer spaced concentric shells integrally connected with a plurality of angularly spaced ribs extending across the spacing between said shells, the upper edge of said outer shell extending above the upper edge of said inner shell, a bottom wall extending between the upper edge of said inner shell and said outer shell above said ribs to form a water-receiving pocket above said bottom wall, said ribs at their lower edges being exposed for engagement with the rim of a cup to support said device thereon, the lower edges of said shells terminating at approximately the lower edges of said ribs so that they are at the rim of said cup when said device is resting thereon, including means at the lower end of said inner shell for retaining a charge of coffee grounds therein and means at the upper end of said inner shell for effecting restricted flow of water from said pocket into said grounds.

2. In a device as set forth in claim 1, said ribs terminating short of said lower edges of said shells whereby the rim of said cup extends slightly into the space between said shells when said device is resting on said cup so that sliding of said device off the rim is prevented by engagement with the lower peripheral marginal surface of said shells.

References Cited in the file of this patent
UNITED STATES PATENTS

| | | |
|---|---|---|
| 151,058 | Schambra | May 19, 1874 |
| 169,626 | Crowell | Nov. 9, 1875 |
| 2,096,127 | Moore et al. | Oct. 19, 1937 |
| 2,599,682 | Wartel et al. | June 10, 1952 |
| 2,732,787 | Osborne | Jan. 31, 1956 |
| 2,835,191 | Clurman | May 20, 1958 |
| 2,899,310 | Dale | Aug. 11, 1959 |
| 3,018,024 | Foord | Jan. 23, 1962 |
| 3,063,359 | Brant | Nov. 13, 1962 |